United States Patent [19] [11] 3,767,529
Yoshinaga et al. [45] Oct. 23, 1973

[54] METHOD OF PRODUCING L-ISOLEUCINE BY FERMENTATION

[75] Inventors: Fumihiro Yoshinaga; Koji Kubota; Itsuo Jujita, all of Kanagawa; Shinji Okumura, Tokyo, all of Japan

[73] Assignee: Ajinomoto Co., Inc., Tokyo, Japan

[22] Filed: Nov. 10, 1971

[21] Appl. No.: 197,483

Related U.S. Application Data

[63] Continuation-in-part of Ser. No. 110,632, Jan. 28, 1971, abandoned.

[30] Foreign Application Priority Data

Feb. 16, 1970 Japan.............................. 45/13210

[52] U.S. Cl....................... 195/30, 195/29, 195/47
[51] Int. Cl............................................ C12d 13/06

[58] Field of Search .................... 195/3, 28, 29, 30, 195/47

[56] References Cited
UNITED STATES PATENTS
3,231,478   1/1966   Uemura et al. ....................... 195/29

FOREIGN PATENTS OR APPLICATIONS
387,091   1963   Japan................................... 195/47

Primary Examiner—Lionel M. Shapiro
Attorney—Hans Berman and Kurt Kelman

[57] ABSTRACT

Certain microorganisms of genus Brevibacterium, Coryne-bacterium and Arthrobacter produce L-isoleucine directly from glucose or acetic acid in the culture medium.

5 Claims, No Drawings

METHOD OF PRODUCING L-ISOLEUCINE BY FERMENTATION

This application is a continuation-in-part of our co-pending application Ser. No. 110,632, filed on January 28, 1971, and simultaneously abandoned.

The present invention relates to a method of producing L-isoleucine by fermentation, and more particularly to a method of directly producing L-isoleucine from a carbon source by bacterial fermentation.

It is known that L-isoleucine is produced from various precursors of L-isoleucine, such as α-aminobutyric acid, α-hydroxybutyric acid, threonine, aspartic acid or fumaric acid when microorganisms are cultured in a medium containing the precursor, as well as a carbon source, nitrogen source and other nutrients (U.S. Pat. Nos. 3,058,888, 3,262,861, 3,231,478). However, L-isoleucine was never produced directly from a carbon source in the absence of any precursor of isoleucine.

We have now found that certain bacteria of genus Brevibacterium, Corynebacterium or Arthrobacter when cultured on a medium containing a carbon source, a nitrogen source and other nutrients in the absence of any precursor of isoleucine produce, L-isoleucine in a very high yield.

A carbohydrate or organic acid may be the carbon source, and suitable bacteria include Brevibacterium flavum AJ-3271 (FERM P-805), Corynebacterium acetoacidophilum AJ-3272 (FERM P-840) and Arthrobacter citreus AJ-3273. Brevibacterium flavum FERM P-805 and Corynebacterium acetoacidophilum FERM P-840 have been deposited in the Fermentation Research Institute, the Agency of Industrial Science and Technology, the Ministry of the Industrial Trade and Industry, Japan, where the strains are available. Arthrobacter citreus AJ-3273 has been derived from Arthrobacter citreus ATCC 17775 by a conventional mutant inducing method, and the mutant strain obtained is resistant to α-amino--β-hydroxyvaleric acid.

Suitable carbohydrates are glucose, starch hydrolyzate or molasses, a suitable organic acid is acetic acid. The carbon source may be present in its full amount at the inoculation of the medium with the bacterium, and may also be added to the medium in several batches. When an organic acid such as acetic acid is used as the sole or principal carbon source, not more than 4 g/dl, and preferably less than 2 g/dl of acetic acid is present initially in the medium, and acetic acid is fed to the medium in amounts of less than 1.5 g/dl during the fermentation. As the fermentation is performed at pH 7.0 to 8.5, it is convenient to feed the additional acetic acid as a mixture of acetic acid and ammonium acetate. The mixture should contain 0.05 to 1.00 mole of ammonium acetate per mole of acetic acid, and preferably 0.1 to 0.4 mole of ammonium acetate. Gaseous ammonia may also be used for the pH adjustment of the medium.

The assimilable nitrogen source, inorganic salts and organic nutrients are entirely conventional, and the nitrogen sources may be corn steep liquor, or polypeptone, as well as inorganic ammonium compounds.

In order to produce L-isoleucine in the culture medium according to the present invention, the culture medium need not contain any costly precursors of isoleucine, such as α-amino--butyric acid, α-hydroxybutyric acid or D-threonine.

L-isoleucine produced and accumulated in the cultured medium may be recovered by conventional methods.

EXAMPLE 1

Brevibacterium flavum AJ-3271 (FERM P-805) was cultured at 31.5°C for 12 hours with stirring and aerating on a seed culture medium containing 1.5 g/dl starch hydrolyzate (glucose equivalent), 0.3 g/dl ammonium acetate, 0.15 g/dl $KH_2PO_4$, 0.04 g/dl $MgSO_4 \cdot 7H_2O$, 2 ppm Fe and Mn ions, 3.0 ml/dl Aji-Eki (Brand Name of soybean protein hydrolyzate), 200 γ/1 biotin, 300 γ/1 vitamin $B_1 \cdot HCl$ and 0.2 g/dl urea, of pH 7.0.

A main culture medium containing 0.8 g/dl ammonium acetate, 0.41 g/dl sodium acetate, 0.30 g/dl $KH_2PO_4$, 0.004 g/dl $MgSO_4 \cdot 7H_2O$, 2 ppm Fe and Mn ions, 20 ml/dl "Aji-Eki," 50 γ/1 biotin, 5 mg/l vitamin $B_1 \cdot HCl$ and 0.2 g/dl urea, of pH 7.2 was prepared, 300 ml of the medium was placed in a jar-fermentor, and sterilized at 110°C for 10 minutes. The medium was inoculated with 15 ml of the seed culture, and cultured at 31.5°C with stirring at 1,350 revolutions per minutes while one-half volume of air was introduced per minute. When the pH of the medium reached 8.2 after 6 hours from the inoculation, 40 percent acetic acid and gaseous ammonia were added to hold the pH of the medium between 7.5 and 8.0. The fermentation was performed for 48 hours, 18 volume percent acetic acid based on the initial volume of the medium was consumed, and 0.96 g/dl L-isoleucine was found to be produced (6.5 percent yield based on the used acetic acid).

One litre of the cultured broth was centrifuged to remove bacterial cells, the supernatant was concentrated, and 3.4 g of crude crystalline L-isoleucine were obtained.

EXAMPLE 2

Corynebacterium acetoacidophilum AJ-3272 (FERM P-840) was cultured in the same way as in Example 1, and the cultured broth was found to contain 0.67 g/dl of L-isoleucine.

EXAMPLE 3

Arthrobacter citreus AJ-3273 was cultured in the same way as in Example 1, and the cultured broth was found to contain 0.48 g/dl of L-isoleucine.

EXAMPLE 4

Brevibacterium flavum AJ-3271 was inoculated on a 20 ml batch of a medium containing 10 g/dl glucose, 0.3 g/dl $KH_2PO_4$, 0.04 g/dl $MgSO_4 \cdot 7H_2O$, 4 g/dl $(NH_4)$, 2 ppm Fe and Mn ions, 100 γ/1 biotin, 1000 γ/1 vitamin $B_1 \cdot HCl$ and 2 ml/dl "Aji-Eki," of pH 7.2, and cultured at 31.5°C for 72 hours with shaking. The cultured broth was found to contain 0.7 g/dl of L-isoleucine.

What we claim is:

1. A method of producing L-isoleucine by fermentation which comprises:
    a. culturing Brevibacterium flavum FERM P-805 or Corynebacterium acetoacidophilum FERM P-840 on a fermentation medium containing an assimilable carbon source, an assimilable nitrogen source, inorganic salts, and minor organic nutrients necessary for the growth of said Brevibacterium or said Corynebacterium under aerobic conditions until L-isoleucine is produced in said fermentation medium; and b. recovering the L-isoleucine produced.

2. A method as set forth in claim 1, wherein said medium is free from any precursor of isoleucine.

3. A method as set forth in claim 1, wherein said bacterium is Brevibacterium flavum FERM P-805 or Corynebacterium acetoacidophilum FERM P-840.

4. A method as set forth in claim 2, wherein said precursor is $\alpha$-aminobutyric acid, $\alpha$-hydroxybutyric acid, threonine, aspartic acid, or fumaric acid.

5. A method as set forth in claim 1, wherein the carbon source in said fermentation medium essentially consists of a carbohydrate or acetic acid.

* * * * *